Figure 1:
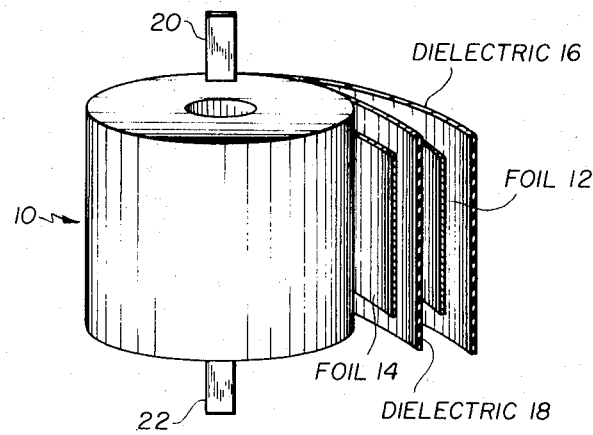

United States Patent

[11] 3,568,015

[72] Inventor Edward Mortin Lobo
New Bedford, Mass.
[21] Appl. No. 798,699
[22] Filed Feb. 12, 1969
[45] Patented Mar. 2, 1971
[73] Assignee Cornell-Dubilier Electric Corporation
Newark, N.J.

[54] CAPACITOR WITH EPOXY SCAVENGER
8 Claims, 2 Drawing Figs.
[52] U.S. Cl.................................................... 317/259,
252/66
[51] Int. Cl..................................................H01g 3/195
[50] Field of Search.......................................... 317/258,
259; 260/47 (E.P.); 252/65, 66

[56] References Cited
UNITED STATES PATENTS
3,090,705  4/1963  Miksits........................ 317/259X
3,242,402  3/1966  Stahr............................ 317/259

OTHER REFERENCES
Berberich & Friedman Stabilization of Chlorinated Diphenyl in Paper Capacitors in Industrial & Engineering Chemistry, Jan. 1948, pp 117—123
Brady Materials Handbook Ninth Edition 1963 McGraw Hill N.Y. p.283

Primary Examiner—E. A. Goldberg
Attorneys—Paul S. Martin and Richard M. Rabkin

ABSTRACT: Electrical capacitors in which the dielectric liquid is a halogenated aromatic compound containing as a scavenger a small amount of a condensation product of epichlorhydrin and a tetraphenylolalkane, which product has an epoxide equivalent of less than 400. A preferred condensation product is a resin obtained from 1, 1, 2, 2-tetraphenylolethane.

PATENTED MAR 2 1971 3,568,015

INVENTOR.
EDWARD M. LOBO

BY Paul S. Martin

ATTORNEY

CAPACITOR WITH EPOXY SCAVENGER

This invention relates to electrical apparatus containing stabilized halogenated dielectric material, and particularly to electrical capacitors.

Electrical capacitors and other electrical apparatus employ dielectric fluids for cooling, for insulation and for excluding ionizable gases. The most widely used group, having particular advantages of safety and high dielectric constants, are the halogenated aromatic compounds. Included in the group of halogenated aromatic compounds are chlorinated diphenyl and related compounds which are commonly sold as askarels. While such compounds have many well-known advantages, they also have a severe and critical disadvantage in that the compounds are subject to breakdown in the presence of electrical stress or discharge, notably corona. When the compounds break down deleterious byproducts are formed, in particular hydrogen chloride which tends to attack the metal parts and the other insulating components of the apparatus and which can therefore result in failure of the capacitor. It has long been known that a scavenger can be employed which would be capable of removing or reacting with the hydrogen chloride decomposition product. In order to be effective in removing the involved hydrogen chloride the scavenger must react quickly to the presence of the decomposition product without substantially degrading the electrical properties of the dielectric liquid. It is particularly important that the scavenger or additive have a minimal effect on the power factor of the capacitor in which the dielectric liquid is employed.

It is an object of the invention to provide a novel and effective dielectric composition comprising halogenated aromatic compounds which meets the practical requirements of a stabilized dielectric fluid.

Another object of the invention is to provide electrical apparatus, especially capacitors, incorporating a novel dielectric fluid including a halogenated aromatic dielectric liquid which provides increased life at sustained operating characteristics.

Other objects and advantages will become apparent and the nature of the invention and its various further aspects and features of novelty will be appreciated from the illustrative disclosure that is given in detail below, and from the accompanying drawings which form a part of this disclosure.

In accordance with one aspect of this invention the improved dielectric liquid comprises the halogenated aromatic liquid and a small amount of a condensation product of epichlorhydrin and a tetraphenylolalkene having an epoxide equivalent less than 500. A preferred such condensation product is the solid resin sold as Epon Resin 1031, which is condensation product of epichlorhydrin and a 1,1,2–2 tetraphenylolethane such as 1,1,2,2-tetra (p-hydroxphenyl) ethane, which resin has an epoxide equivalent of about 210—240 and a Gardner-Hold viscosity of about $Z_4$—$Z_8$ (measured on an 80 percent by weight solution in methyl ethyl ketone, using bubble tube method, SMS 27; ASTM D–154). This solid resin, which melts at about 80° C. (Durrans Mercury Method) is described as a mixture of isomers and homologs having the idealized structure of 1,1,2,2, tetra (2,3-epoxypropoxyphenyl) ethane, e.g. 1,1,2,2-tetra(p-2,3-epoxypropoxyphenyl ethane which can be made by the condensation of 4 mols of epichlorhydrin with 1 mol of 1,1,2,2-tetra (p-hydroxyphenyl) ethane. Its epoxide equivalent of about 210—240, rather than the somewhat lower value corresponding to the idealized structure, indicates that further condensation has taken place, somewhat beyond the stage of the monomeric tetra (2,3-epoxypropoxyhenyl) ethane. The condensation of the epichlorhydrin and the tetraphenylolalkane may be carried out in the manner conventionally used in the art for condensing epichlorhydrin and a polyhydric phenol to make an epoxy resin (e.g. in the presence of sodium hydroxide so as to split off HCl from the condensing molecules).

A particularly suitable halogenated aromatic liquid for use in this invention is trichlorodiphenyl, such as a mixture of isomers having their chlorine substituents in various relationships (e.g. "Arochlor 1242") and which may contain other components, e.g. halogenated aromatic hydrocarbons of different degrees of substitution. Other chlorinated aromatic compounds are pentachlordiphenyl, hexachlordiphenyl, trichlorbenzene, tetrachlorbenzenes and mixtures of various chlorinated aromatic hydrocarbons.

Figure 2:
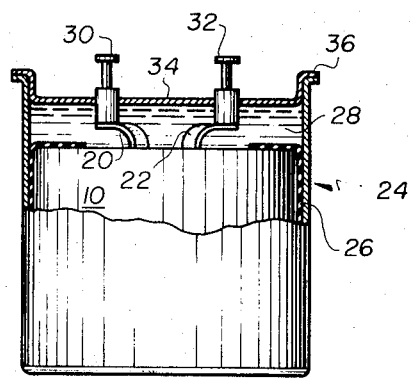

In the drawings:

FIG. 1 illustrates an electrical capacitor winding to which the present invention pertains; and FIG. 2 illustrates, in elevation, partly in section, an electrical capacitor in which the invention is incorporated.

Referring to FIG. 1, the capacitor section 10 comprises a pair of electrodes and longitudinally extending strips of foil 12, 14 of conducting material such as aluminum and a pair of longitudinally extending strips 16 and 18 of insulating or dielectric material such as capacitor grade kraft paper. The strips of foil 12, 14, dielectric 16, 18 are alternately disposed and are wound into a compact capacitor body 10. For purposes of illustration the strips of dielectric 16, 18 are shown as single layers but normally comprise multiple strips of dielectric. In this capacitor shown, the strips of dielectric are wider than the strips of conducting material and project a sufficient distance beyond the longitudinal edges thereof so as to prevent short circuiting between alternately disposed conducting foils.

During the winding of the capacitor section the oppositely extending tap straps 20, 22 which are of conducting material such as tinned copper strips are placed in direct contact with the foils, as at the midpoint of the longitudinal foils 12, 14 respectively. The tap straps provide the means for making electrical connection to the foil.

FIG. 2 shows a capacitor assembly 24 in which the wound capacitor section 10 is enclosed in a casing 26 containing a dielectric liquid 28 which impregnates the section. The dielectric liquid 28 is a halogenated aromatic compound which contains the epichlorhydrin-tetraphenylolalkane condensation product. Tap straps 20 and 22 are connected to terminals 30 and 32 respectively mounted on the cover of the casing. The cover 34 is hermetically sealed to the casing 26 at the periphery 36 of the cover. Therefore, during the operation of the capacitor any products of decomposition of the chlorinated aromatic dielectric contained within the casing are retained therein and no provision is made for the withdrawal or replacement of the dielectric during the life of the capacitor.

The products of the decomposition of the dielectric liquid are usually in the form of hydrochloric acid which attacks the paper dielectric strips 16, 18 and the dielectric liquid itself leading to premature failure of the electrical capacitor.

The invention is particularly suitable for the type of capacitor known as an AC capacitor, designed for operation at relatively low frequencies, usually 60 cycles. Such capacitors may be made in various ratings, e.g. from 1 microfarad to 60 microfarads or higher, for operation at various voltages, e.g. 100—2,000 volts or even higher, such as 50,000 volts or more. By the practice of this invention there are obtained AC capacitors having excellent capacitance, insulation resistance, power factor (which is very low and stable even after very long term use), and dielectric absorption. The use of the epichlorhydrin-tetraphenylolalkane condensation products has given results unexpectedly superior to those obtained with other epoxide stabilizers.

The solid dielectric used in the capacitor may be paper, such as the capacitor grade kraft paper mentioned previously. Especially good results in the practice of this invention are obtained when the solid dielectric is an adsorbent paper, such as a paper carrying a small amount of a suitable adsorbent (e.g. about 2 percent of highly adsorbent alumina); such papers are commercially available as Weyerhaeuser "O" grade, Schweitzer "Edsorb" or Stevens "Stabilized" paper. It is also within the broader scope of the invention to use a solid dielectric which comprises a plastic film, such as a thin film of biaxially oriented polypropylene; such films may be used alone or in combination with paper, e.g. the solid dielectric between two layers of metal foil may be an assemblage of one layer of paper face to face with one layer of plastic film.

For best results the halogenated aromatic liquid containing the epichlorhydrin-tetraphenylolalkane condensation product should be treated to remove traces of water and other small ionic or highly polar molecules. It has been found that this can be accomplished, so as to reduce the water content to, say, less than one part per million by filtering the liquid through an artificial zeolite such as the crystalline zeolites known as molecular sieves and having a basic formula $M_{2/n}O \cdot Al_2O_3 \cdot SiO_2 \cdot yHO$ where M is a cation of $n$ valance. Particularly good results have been obtained with Type 4A molecular sieve which has the following unit cell formula: $Na_{12}[AlO_2)_{12}] \cdot 27H2O$; this material, having a free aperture size of some 3.5 angstroms in diameter, adsorbs molecules having an effective diameter of less than 4 angstroms (such as water, ethanol, $H_2S, CO_2, SO_2$ etc.). Another suitable molecule sieve is of the known type 3A, which adsorbs molecules with an effective diameter of less than 3 angstroms such as water and ammonia. Heating the liquid, e.g. to 70° C., has been found to promote removal of the undesired materials. At the same time, little if any of the epichlorhydrin-tetraphenylolalkane condensation product is removed by this treatment.

The proportion of the epichlorhydrin-tetraphenylolalkane condensation product in the dielectric liquid used to impregnate the capacitor is suitably within the range of about 0.05—5 percent; proportions of about one-half percent or in the range of about one-fourth to three-fourths percent are preferred. The use of these proportions generally results in little or no increase in the viscosity of the dielectric liquid, whose viscosity may, for example, be about 6 cps.

The impregnation of the capacitor is preferably carried out by removing air and volatile materials from the unimpregnated capacitor. This may be done by heating it to a temperature of say 110°—115° C., for an extended period (e.g. 20 hours or more) at atmospheric pressure, evacuating the atmosphere from the capacitor while it is still at the elevated temperature (as by applying a subatmospheric pressure of 100 microns Hg absolute or less for 50 or 60 hours) and flooding it with the dielectric liquid (containing the epichlorhydrin-tetraphenylolalkane condensation product) at an elevated temperature (e.g. 80°—85° C.) while maintaining the capacitor under said subatmospheric pressure, then keeping the impregnated capacitor hot while raising the pressure to atmospheric and finally allowing the capacitor to cool and sealing it before, or after, cooling.

Epoxide equivalent is the number of grams of the product containing one gram-equivalent of epoxide, SMS766 (ASTM D–1651).

It will be recognized by those skilled in the art that various changes and modifications may be made herein without departing from the spirit or scope of the invention.

I claim:

1. An electrical device comprising metal parts separated by a solid dielectric material and a dielectric liquid impregnating said material, said liquid comprising chlorinated aromatic dielectric compound containing about 0.05 to 5 percent of an epichlorohydrin-tetraphenylolalkane condensation product having an epoxide equivalent of less than 400.

2. An electrical device as in claim 1 in which said condensation product is a normally solid resin dissolved in said chlorinated compound.

3. An electrical device as in claim 1 in which said condensation product is a condensation product of 1,1,2,2-tetra (hydroxyphenyl) ethane and epichlorhydrin.

4. An electrical device as in claim 1 in which condensation product is a normally solid resin having an epoxide equivalent of up to about 240.

5. An electrical device as in claim 3, said electrical device being a capacitor having aluminum foil electrodes, a paper dielectric between said electrodes, and said dielectric liquid impregnating said paper, said chlorinated aromatic compound being trichlorodiphenyl and said condensation product being a normally solid resin dissolved in the liquid in a concentration of about one half percent.

6. An electrical device as in claim 1, said electrical device being a capacitor having wound electrodes and dielectric strips separating the electrodes.

7. An electrical device as in claim 1, said electrical device being a capacitor having wound electrodes and paper strips separating said electrodes, and said dielectric liquid impregnating said paper strips.

8. An electrical device as in claim 7 wherein said paper contains a small percentage of highly adsorbent alumina.